May 17, 1966 T. C. BOUR 3,251,665
METHOD FOR THE PRODUCTION OF GLASS FIBERS
Filed May 31, 1963 2 Sheets-Sheet 1
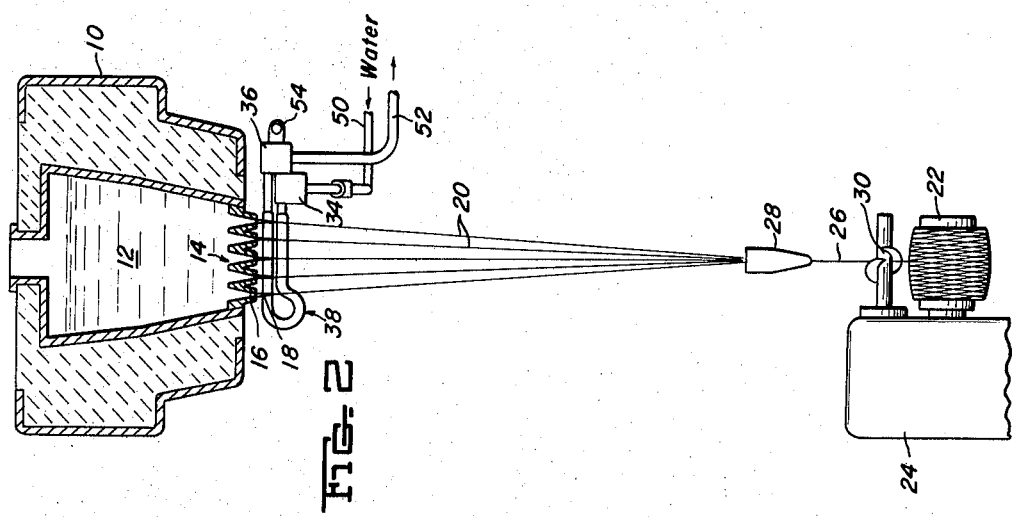
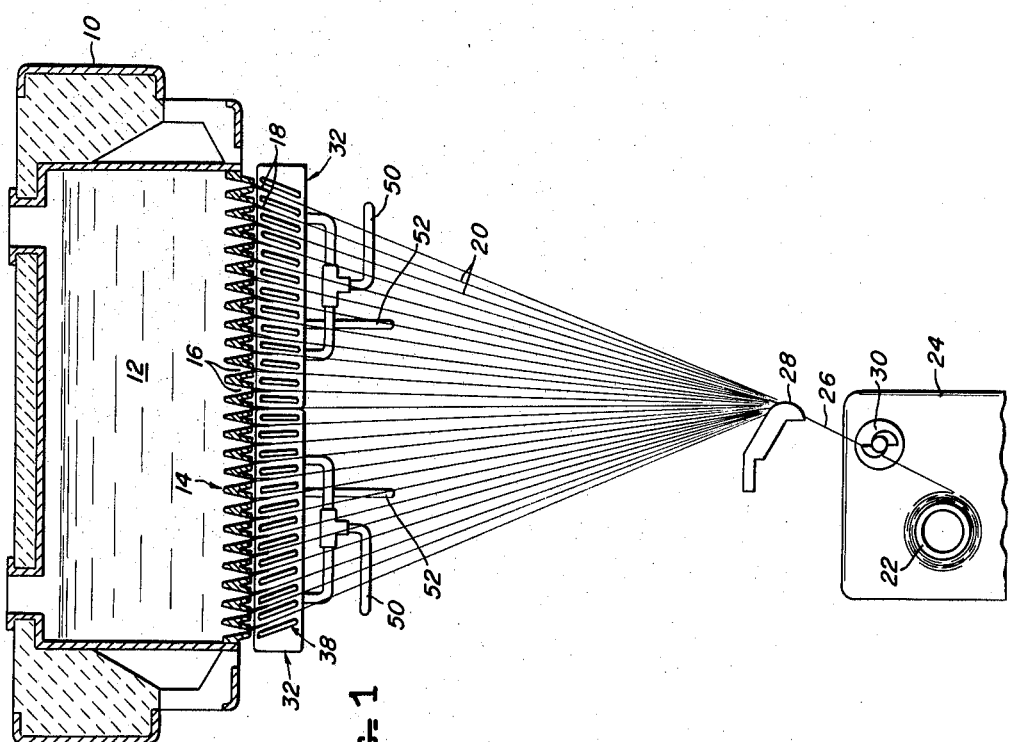
INVENTOR
THOMAS C. BOUR
By Oscar L. Spencer
Attorney

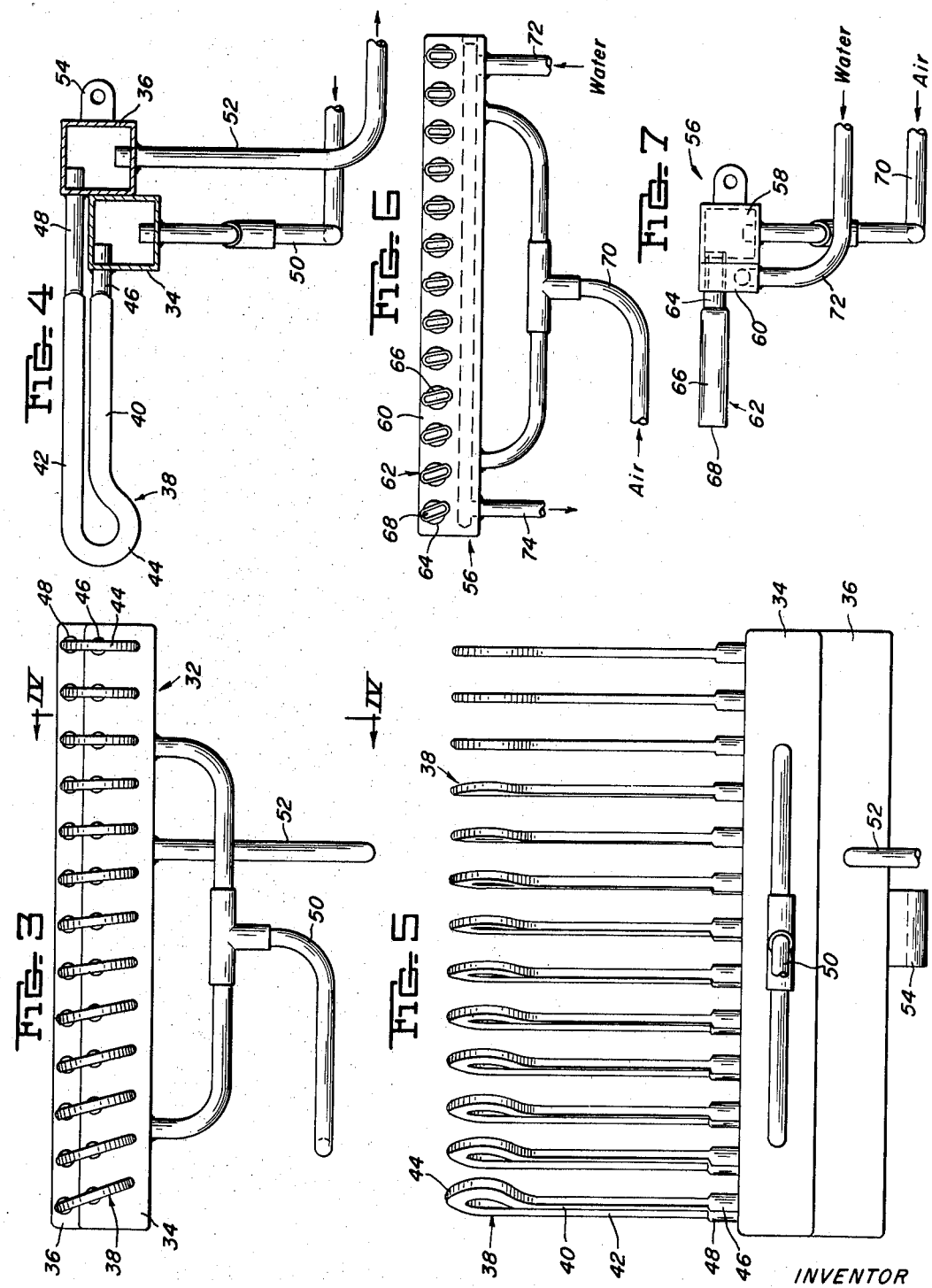

United States Patent Office 3,251,665
Patented May 17, 1966

3,251,665
METHOD FOR THE PRODUCTION OF GLASS FIBERS
Thomas C. Bour, Allison Park, Pa., assignor to Pittsburgh Plate Glass Company, Pittsburgh, Pa., a corporation of Pennsylvania
Filed May 31, 1963, Ser. No. 284,471
1 Claim. (Cl. 65—2)

This invention relates to improvements in the production of fibers from heat softenable materials and more particularly to improvements in the method for cooling the cones of molten material from which the fibers are being continuously drawn.

The invention hereinafter described has particular utility with the production of continuous glass fibers. The conventional process for continuously producing glass fibers most commonly used in the United States involves drawing a number of individual glass fibers from an electrically heated platinum bushing associated with a refractory furnace containing a molten supply of glass. The bushing has a plurality of tips defining orifices through which the glass issues as molten streams. The molten streams flowing from the orifices are attenuated in the form of cones of molten glass. The individual fibers are drawn from the cones of molten glass at a high rate of speed and are grouped into a strand as they pass over a suitable guide. The strand is thereafter wound on a rapidly rotating forming tube. The rotation of the forming tube provides the pulling force for attenuating the fibers.

It has been found advantageous to heat the glass in the bushing to a relatively high temperature so as to produce fibers of great homogeneity. However, because of the relative location of the bushing and the cones of glass from which the fibers are drawn, heat is radiated from the bushing to the cones of glass. As a result, the molten glass in the cones can not cool rapidly enough to form continuous fibers. When the viscosity in the molten glass cones is too low, the cones have a tendency to constrict into droplets instead of flowing as a continuous stream. This is caused by the surface tension overcoming viscosity, since the glass surface tension changes very little with temperature. When heated bushings are employed, it has been found necessary for proper fiber formation to extract heat energy from the molten cones of glass and the fibers attenuated from the apex of the molten cones of glass. The cooling of the molten cones of glass increases the viscosity of the molten glass cones and thereby eliminates constriction of the cones and droplet formation. One of the principal difficulties encountered in cooling the glass cones is to maintain a uniform cooling rate for all the glass streams issuing from the bushing.

It is well known to provide means for extracting heat energy from the cones of glass from which the fibers are drawn. An example of such teaching can be found in Russell #2,908,036. Therein, apparatus is disclosed for cooling the cones of molten glass by means of solid metallic fins positioned between the lateral rows of glass cones formed on the bottom wall of the bushing. The lateral fins in Russell are connected to a common header device through which cooling material such as water is circulated. The solid fins do not provide the most efficient heat transfer between the molten glass cones and the cooling liquid since the heat transfer depends on the thermal conductivity of the fins. To increase the conductivity the fins are formed of metals having a high coefficient of thermal conduction.

It has been discovered by circulating a cooling fluid through laterally extending tube type coolers positioned between the cones of molten glass that the heat transfer from the molten cones of glass and the attenuated fiber adjacent thereto to the cooling media is increased substantially over the cooling devices of the prior art.

Briefly, the invention includes a pair of headers arranged in parallel relation to each other. The headers extend longitudinally of and adjacent to the bushing from which the glass fibers are drawn. A plurality of tube type coolers extend laterally from the headers between rows of molten glass cones. The laterally extending tubular coolers have one end portion connected to one of the headers and the other end portion connected to the other header. The invention thus provides a method for continuously circulating a cooling fluid through tubular coolers positioned between lateral rows of molten glass cones. With this arrangement the rate of heat transfer is more accurately controlled among all the glass cones.

Accordingly, the principal feature of this invention is to improve the cooling of the molten glass cones by circulating a cooling media through tubular coolers laterally positioned between rows of molten glass cones.

Another feature of this invention is to provide a cooler having endless tubes connecting a pair of headers through which a cooling fluid continually circulates. The cooling fluid is supplied to one of the common headers, circulates through the cooling tubes positioned laterally between rows of molten glass cones and is withdrawn from a second common header.

Another feature of this invention is to position certain of the endless cooling tubes in angular relation to the remaining cooling tubes so that they conform with the converging relation of the fibers as they are drawn from the bushing and gathered into a strand.

The above and other features and advantages of this invention will be more completely disclosed and described in the following specification, the accompanying drawings and the appended claim.

In the drawings:

FIGURE 1 is a view in front elevation of the apparatus used in the glass fiber forming process and includes the cone cooling means of the present invention.

FIGURE 2 is a view in side elevation of the glass fiber forming process illustrated in FIGURE 1.

FIGURE 3 is an enlarged front elevational view of the left section of the cone cooler illustrated in FIGURE 1.

FIGURE 4 is a view in section taken along the line 4—4 of FIGURE 3.

FIGURE 5 is a bottom plan view of the left section of the cone cooler illustrated in FIGURE 3.

FIGURE 6 is an enlarged elevational view of another species of the tubular cone cooler.

FIGURE 7 is a view in side elevation of the cone cooler illustrated in FIGURE 6.

Referring to the drawings there is shown a glass melting furnace 10 containing a supply of molten glass 12 and having an electrically heated platinum alloy bushing 14 attached to the bottom of furnace 10. The bushing 14 is provided with a plurality of orifices in the form of tips 16 through which molten glass flows and forms cones 18. The tips are usually formed in a number of both longitudinal and lateral rows, for example five longitudinal rows, as illustrated in FIGURE 2, and twenty-five lateral rows, as illustrated in FIGURE 1. This provides about one hundred twenty-five filaments which are collected into a single strand. The number of longitudinal and lateral rows may vary so that the total number of tips may range from one hundred to four hundred, or more. Glass fibers 20 are drawn from the cones 18 at a very high rate of speed and are wound on a rapidly rotating forming tube 22. The forming tube 22 is mounted on a winder support 24 which is positioned beneath the furnace 10. The glass fibers 20 are gathered into a strand 26 which passes over a gathering shoe or guide 28. A size containing a liquid binder and a lubricant is applied to the fibers 20 as they are grouped into the strand 26. The strand 26 passes over a suitable traversing device 30 and is wound on a forming tube 22.

The fibers 20 converge from the bushing 14 to the gathering shoe or guide 28 so that certain of the fibers 20, especially the fibers adjacent the ends of the bushing, deviate substantially from the vertical in converging fan-like relation as is illustrated in FIGURE 1.

The cone cooler assembly generally designated by the numeral 32 includes an inlet header 34 and an outlet header 36. The headers 34 and 36 are generally rectangular in cross section and have end walls to form a suitable chamber therein. The headers 34 and 36 are arranged in parallel relation and adjacent to each other as is illustrated in FIGURE 4. The cone cooler assembly 32 is positioned with the headers 34 and 36 extending longitudinally along one side of bushing 14. A plurality of tubular coolers generally designated by the numeral 38 are connected to both the inlet header 34 and outlet header 36 and extend laterally between the rows of molten glass cones. The tubular coolers 38 are similar in construction and one of the tubular coolers is illustrated in detail in FIGURE 4. The tubular coolers are illustrated as extending laterally between adjacent rows of molten glass cones 18 in FIGURE 1 so that each row of molten glass cones has a tubular cooler on opposite lateral sides thereof. It should be understood, however, for certain applications it may be sufficient to position tubular cone coolers so that they extend laterally between alternate lateral rows of molten glass cones and each row of molten glass cones has a tubular cooler positioned adjacent one side thereof.

The tubular coolers 38 are preferably formed of thin walled tubing and are so shaped to have a lower portion 40, an upper portion 42 and an intermediate U-shaped portion 44. The lower portion 40 and upper portion 42 are arranged in parallel relation to each other and have end portions 46 and 48. The lower portion 40, upper portion 42 and intermediate portion 44 are flattened to provide a minor horizontal dimension and a major vertical dimension to define a pair of substantially parallel side walls, the flattened portion of the tube being substantially rectangular in cross section. The end sections 46 and 48 are circular in cross section with end section 46 extending through a suitable aperture in inlet header 34 and other end section 48 extending through a suitable aperture in outlet header 36. The tubular cooler end sections 46 and 48 are suitably secured to the respective headers 34 and 36 as by welding, silver brazing, or the like. The flattened portions 40, 42 and 44 are so shaped that the tubular cooler 38 fits between the rows of molten glass cones 18 and is spaced laterally therefrom. With this arrangement cooling fluid, which may be either a gas or a liquid, is circulated through tubular cooler 38 by flowing from inlet header 34 through lower portion 40, looped portion 44, upper portion 42 to the outlet header 36. Fluid flow may also be in the opposite direction.

The tubular coolers 38 adjacent the ends of the headers 34 and 36 are angularly displaced from the vertical to conform with the converging relation of the end fibers, as illustrated in FIGURE 1. With this arrangement the molten glass cones and the fibers attenuated therefrom remain substantially equidistant between adjacent tubular coolers 38. The angular deviation of the tubular coolers 38 is reduced on each of the subsequent tubular coolers until the tubular coolers 38 adjacent the center of the bushing 14 are substantially vertical, as is illustrated in FIGURE 1.

In the preferred embodiment, the cooler assemblies 32 are formed in two sections, a left-hand section and a right-hand section. Each section has a separate inlet header 34 and a separate outlet header 36. The inlet header 34 has a T-shaped supply conduit 50 secured thereto and arranged to supply the header 34 with a cooling fluid. The outlet header 36 has withdrawal conduit 52 connected thereto to remove the fluid as it has circulated through the plurality of tubular coolers 38 extending laterally between rows of molten glass cones. The fluid as it circulates through the plurality of tubular coolers absorbs heat radiated from the molten glass cones. The velocity at which the fluid medium is circulated through the header 34, tubular coolers 38 and outlet header 36 is dependent upon the amount of cooling desired. The cone cooler assemblies 32 are maintained in position relative to the bushing 14 by means of suitable brackets such as bracket 54 secured to the rear wall of outlet header 36.

Another embodiment of the tubular cone cooler assembly is illustrated in FIGURES 6 and 7 and is generally designated by the numeral 56. The cone cooler assembly illustrated in FIGURES 6 and 7 includes a first rectangular header 58 and a second rectangular header 60. The headers 58 and 60 are arranged in side by side relation and form two separate fluid conducting chambers. The headers 58 and 60 are positioned adjacent to a longitudinal edge of the bushing 14 in a manner similar to the headers 34 and 36 previously described. The headers 58 and 60 are suitably secured to each other and have aligned apertures therethrough arranged to receive tubular coolers 62. The tubular coolers 62 extend laterally from the headers 58 and 60 between lateral rows of molten glass cones. The tubular coolers 62 have a connecting section 64 which is circular in cross section and a flattened cooling section 66. The connecting section 64 extends through the header 60 into the header 58 and is suitably secured therein. The coolant enters header 58 through a suitable conduit 70 and is conveyed through the tubular cooler connecting section 64 to the flattened cooling section 66. The cooling section 66 has an open end portion 68 through which the coolant is discharged into either the atmosphere or a suitable receiver, not shown. A second coolant is circulated through the header 60 by entering one end thereof through conduit 72 and is discharged therefrom through conduit 74. The coolant in header 60 communicates with the external surface of the tubular cooler connecting section 64 extending therethrough and serves to control the temperature of tubular coolers 62 and also the coolant flowing therethrough.

With this arrangement one cooling fluid such as water or the like can be circulated through the header 60 and a second coolant fluid such as air can be circulated through the header 58 and tubular coolers 62. When a gas such as air is employed as the coolant circulated through the header 58 and the tubular coolers 62, a receiver is not required adjacent the tubular cooler open end portion 68.

The cone cooler assemblies 56 illustrated in FIGURES 6 and 7 are preferably arranged in a left-hand section and a right-hand section similar to the cone cooler assemblies illustrated in FIGURE 1. The flattened portions 66 of tubular coolers 62 are also arranged in angular relation to the vertical in the respective headers 58 and 60, as is illustrated in FIGURE 6, so that the converging filaments are positioned intermediate therebetween.

According to the provisions of the patent statutes, the principle, preferred construction, and mode of operation of the invention has been explained and what is considered the best embodiments have been illustrated and described. However, it should be understood that, within the scope of the appended claim, the invention may be practiced otherwise than as specifically illustrated and described.

I claim:

In the method of producing glass fibers from a body of molten glass wherein a portion of said molten glass is within an electrically heated bushing having orifices therein through which said molten glass flows and forms rows of molten glass cones, the glass fibers being drawn from the rows of molten glass cones and gathered into a strand, the improvement comprising passing a cooling fluid laterally between rows of said molten glass cones in a given lateral direction along a path at a level spaced from the bushing and adjacent to said cones of glass to cool said molten glass cones, and returning the cooling fluid along a second path located between said first-named path and the bushing.

References Cited by the Examiner

UNITED STATES PATENTS

| | | | |
|---|---|---|---|
| 900,411 | 10/1908 | Morterud | 165—176 |
| 2,650,802 | 9/1953 | Huet | 165—176 |
| 2,908,036 | 10/1959 | Russell | 65—12 |
| 3,048,640 | 8/1962 | Glaser | 65—11 |

FOREIGN PATENTS 859,898  12/1952  Germany.

DONALL H. SYLVESTER, *Primary Examiner.*

C. VAN HORN, G. R. MYERS, *Assistant Examiners.*